United States Patent [19]

Andres et al.

[11] Patent Number: 4,699,424
[45] Date of Patent: Oct. 13, 1987

[54] ADJUSTABLE BACK SUPPORT FOR MOTOR VEHICLES

[75] Inventors: Rudolf Andres, Sindelfingen; Hermann Möller, Görtringen; Holger Seel, Aidlingen, all of Fed. Rep. of Germany

[73] Assignee: Daimler-Benz Aktiengesellschaft, Stuttgart, Fed. Rep. of Germany

[21] Appl. No.: 923,050

[22] Filed: Oct. 24, 1986

[30] Foreign Application Priority Data

Oct. 24, 1985 [DE] Fed. Rep. of Germany ....... 3537846

[51] Int. Cl.4 .............................................. A47C 3/00
[52] U.S. Cl. ...................................... 297/284; 5/455; 5/456; 297/DIG. 3; 297/460
[58] Field of Search ................. 297/284, DIG. 3, 460; 5/455, 456, 465, 437, 441

[56] References Cited

U.S. PATENT DOCUMENTS

| 2,812,804 | 11/1957 | Sandor | 297/284 X |
| 2,896,612 | 7/1959 | Bates et al. | 5/456 X |
| 3,330,598 | 7/1967 | Whiteside | 297/284 |
| 4,163,297 | 8/1979 | Neumark | 5/455 X |
| 4,281,425 | 8/1981 | Jacobs | 5/455 |
| 4,472,847 | 9/1984 | Gammons et al. | 5/456 X |
| 4,497,517 | 2/1985 | Gmeiner et al. | 297/284 X |

FOREIGN PATENT DOCUMENTS 3432871 9/1984 Fed. Rep. of Germany .

Primary Examiner—James T. McCall

[57] ABSTRACT

In order to achieve with an adjustable back support a further comfort increase, supports consisting of individual air chambers are accommodated in the backrest of a motor vehicle seat stacked flake-shaped one above the other. The approximately horizontally directed boundary edges of the air chambers are constructed wave-shaped so that wave troughs and coordinated wave peaks of two adjoining air chambers overlap owing to the stacking.

4 Claims, 2 Drawing Figures

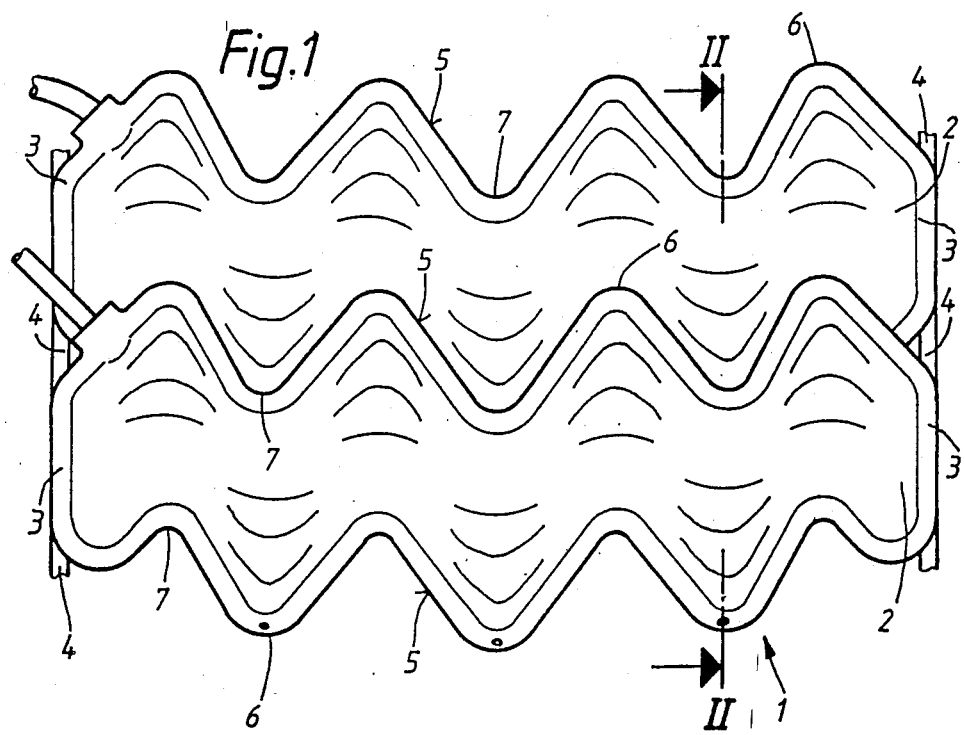
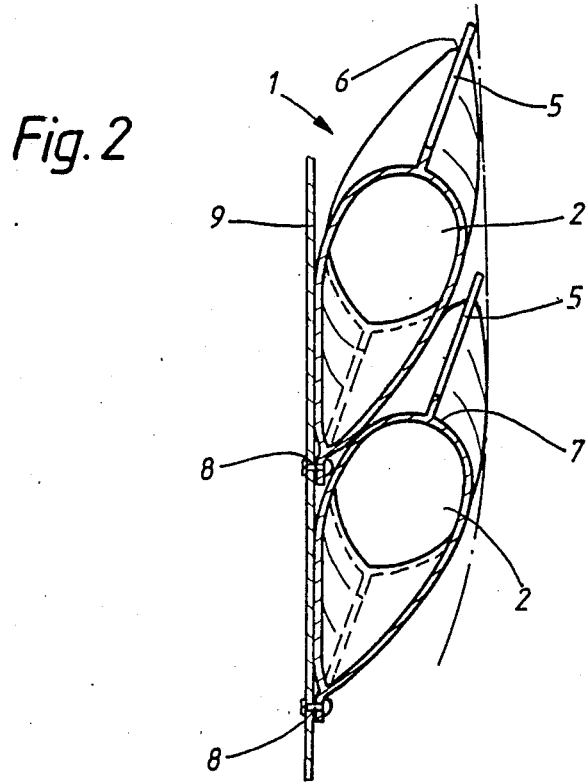

ADJUSTABLE BACK SUPPORT FOR MOTOR VEHICLES

The present invention relates to an adjustable back support for motor vehicle seats, consisting of several air chambers adapted to be inflated independently of one another which are embedded one above the other in the backrest and are separated from one another in the horizontal direction by mutually parallel undulated boundaries.

Such a back support, in which an air cushion is subdivided into several air chambers by the undulated boundaries, can be found in the DE-OS 31 25 588. In relation to one air chamber, one obtains by the wave-shape a soft transition and termination to the adjoining padding section. If, however, two adjacent chambers are filled, then it will lead to a distinct trough or valley formation between the highest peak lines of the two chambers which are disposed relatively far from one another. With a stronger support of the back, the highest raised portions or peaks of each chamber are therefore noticeable through the padding as barrel-shaped pressure zone.

It is the object of the present invention to provide a back support in which also with filled adjacent chambers no annoying pressure occurs during the support of the back.

The underlying problems are solved according to the present invention in that the back support consists of individual air chambers which have boundary edges of similar wave shape extending mutually parallel in the horizontal direction, and in that the air chambers are stacked flake-shaped one above the other in such a manner that the wave peaks and wave troughs mutually overlap. By reason of the overlap within the area of adjacent wave peaks and wave troughs, whereby by reason of the loose stacking the overlap still further increases with increasing chamber volumes owing to the unimpaired expansion possibility of the air chambers a pronounced valley formation or trough formation no longer occurs so that a back support will establish itself which, after a soft rise, remains at an essentially constant level and then again terminates softly.

A predetermined coordination of the individual air chambers is achieved, connected with a simple assembly, if the air chambers are connected among each other by tapes engaging at their approximately vertically directed edges.

A positionally accurate fixing of the air chambers is assured if the air chambers are provided within their edge area of their wave peaks opposite the covering padding layer, with apertures for the fixation at a far-reachingly rigid backrest part.

These and other objects features and advantages of the present invention will become more apparent from the following description when taken in connection with the accompanying drawing which shows, for purposes of illustration only, one embodiment in accordance with the present invention, and wherein:

FIG. 1 is a plan view on two air chambers of an inflatable back support in accordance with the present invention; and FIG. 2 is a cross-sectional view taken along line II—II in FIG. 1.

Referring now to the drawing wherein like reference numerals are used throughout the two views to designate like parts, a back support generally designated by reference numeral 1 which is embedded in a conventional manner (not shown) in the backrest of a motor vehicle seat and is covered by at least one padding layer, consists of several air chambers 2—of which only two are shown—which for the creation of a predetermined, easily attainable installed arrangement are connected with one another by tapes 4 exclusively within the area of their essentially vertically directed edges 3 in such a manner that the individual air chambers 2 can change their volume without influencing on one another.

In the horizontal direction, the air chambers 2 include two boundary edges 5 with mutually parallelly aligned wave-shape. In order that a soft transition, thereupon an approximately flat pressure zone and finally a soft termination without pronounced droop between two air chambers 2 is achieved when the air chambers 2 are inflated—which is indicated in FIG. 2 by a dash-and-dotted line—, these air chambers 2 are stacked one above the other flake-shaped so that mutually coordinated wave peaks 6 of the one and wave valleys or troughs 7 of the other air chambers 2 mutually overlap and wherein the air chambers have relative thin wavey and pointed boundary edges with the thin pointed peaks of the boundary edges of one chamber overlying the thin valley or trough edges of the boundary layer of another chamber.

For fixing the air chambers 2 in an accurately fitting manner, the lower wave peaks 6 thereof, as shown in the drawing, are provided along the edges with apertures and are secured with the assistance of conventional fastening means 8, preferably of the type adapted to be clipped on, at a far-reachingly rigid backrest part 9 aligned at the back side of the backrest which may be constructed as shell.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modification as are encompassed by the scope of the appended claims.

We claim:

1. An adjustable back support for motor vehicle seats comprising: at least two substantially identically shaped independently inflatable air chamber means embedded in a backrest and partially superimposed upon one another; each chamber having two horizontally disposed substantially wave-shaped boundary means defined by plural straight portions connected between plural curved portions; two adjacent curved portions along one boundary means of one inflatable air chamber means, vertically facing in opposite directions; two similarly facing curved portions on different boundary means of one inflatable air chamber means being in vertical alignment with one another; straight portions of one boundary means being parallel to straight portions of the other boundary means of the same inflatable chamber means; a cross-sectional area of an inflatable chamber means between two straight parallel portions of opposite boundary means being widest at a mid-point between two straight parallel portions on opposite boundary means and narrowly tapering from the mid-point toward the straight parallel portions of the boundary means; and wherein the at least two independently inflatable air chamber means have adjoining boundary means superimposed upon one another with all curved portions of the boundary means of the at least two independently inflatable air chamber means, which face in the same vertical direction, being in vertical alignment with one another.

2. An adjustable back support according to claim 1, wherein the air chamber means are connected with each other by tape means engaging at their approximately vertically directed edges.

3. An adjustable back support according to claim 2, wherein the air chamber means are provided with aperture means within the edge area of their wave peaks opposite a covering padding layer for the fixation at a far-reachingly rigid backrest part.

4. An adjustable back support according to claim 1, wherein the air chamber means are provided with aperture means within the edge area of their wave peaks opposite a covering padding layer for the fixation at a far-reachingly rigid backrest part.

* * * * *